United States Patent [19]
Maltby et al.

[11] Patent Number: 4,723,122
[45] Date of Patent: Feb. 2, 1988

[54] REMOTELY CALIBRATABLE INSTRUMENT SYSTEM

[75] Inventors: Frederick Maltby, Jenkintown; Richard G. Hall; Jonathan L. Kramer, both of Warminster; Howard S. Hoopes, Hatfield; Steven R. Petersen, Ambler, all of Pa.

[73] Assignee: Drexelbrook Controls, Inc., Horsham, Pa.

[21] Appl. No.: 791,319

[22] Filed: Oct. 25, 1985

[51] Int. Cl.⁴ ............................................. G01F 23/26
[52] U.S. Cl. ........................... 340/870.380; 73/304 C; 324/61 P; 340/870.040
[58] Field of Search ....................... 340/870.38, 870.37, 340/870.3, 870.04; 324/61 P, 60 R, 61 R, 130, 57 R, 65 P, 63; 364/482, 571; 73/290 R, 304 C

[56] References Cited

U.S. PATENT DOCUMENTS

| | | | |
|---|---|---|---|
| 4,146,834 | 3/1979 | Maltby et al. | 324/60 R |
| 4,196,417 | 4/1980 | Fasching et al. | 340/870.04 |
| 4,363,030 | 12/1982 | Maltby et al. | 324/60 R |
| 4,451,826 | 5/1984 | Fasching | 340/870.04 |
| 4,499,766 | 2/1985 | Fathauer et al. | 70/304 C |
| 4,573,040 | 2/1986 | Maltby | 324/57 R |
| 4,589,077 | 5/1986 | Pope | 70/304 C |
| 4,590,575 | 5/1986 | Emplit | 364/509 |

FOREIGN PATENT DOCUMENTS 0101580 7/1983 European Pat. Off. .
1524853 8/1974 United Kingdom .

Primary Examiner—Donald J. Yusko
Attorney, Agent, or Firm—Woodcock Washburn Kurtz Mackiewicz & Norris

[57] ABSTRACT

A two-wire, admittance-responsive instrument system in which a transmitter, receiver and calibrator are connected by a two-wire transmission line is disclosed. The calibrator repetitively transmits a calibration enabling signal causing the transmitter to increment a reference admittance for comparison to a sensed admittance corresponding to a known physical condition. The calibrator monitors the bistable output signals transmitted by the transmitter in the calibration mode, which changes state when the incremented reference admittance bears a predetermined relationship to the sensed admittance. The calibrator may then transmit additional calibration enabling signals causing preload to be established for transmitter operation.

99 Claims, 10 Drawing Figures

REMOTELY CALIBRATABLE INSTRUMENT SYSTEM

FIELD OF THE INVENTION

This invention relates to instrument systems. More particularly, this invention relates to remotely calibratable admittance-responsive instrument systems useful, for example, for detecting the level of materials in a vessel.

BACKGROUND AND OBJECTS OF THE INVENTION

The art has recognized for many years that instruments can be made, to measure the level of materials in a vessel, which operate on admittance responsive principles, whereby the admittance between a probe in a vessel and the vessel is measured, typically by driving the probe with an rf signal and comparing the admittance of the probe to a reference admittance, e.g., in a bridge circuit. Many prior art patents show this subject matter generally, including commonly-assigned U.S. Pat. Nos. 4,146,834 and 4,363,030. Typically, calibration of these prior art systems has been performed manually; the level of materials in the vessel is controlled to bear some predetermined relationship to the probe, and the reference admittance carried by the transmitter at the vessel is manually adjusted until the transmitter's output signal is appropriate for the level of the materials. Frequently, plant conditions make it difficult or hazardous for a person to gain access to the transmitter to perform calibration manually, so that while this approach is workable, it would be desirable if calibration could be accomplished in a more efficient fashion; in particular, it would be desirable to provide a system in which calibration could be accomplished automatically and remotely, to eliminate the necessity of an operator's having to physically approach the transmitter.

It is accordingly an object of the invention to provide a remotely-calibratable admittance-responsive instrument system.

The art has generally standardized on so-called two-wire instrument systems, in which a receiver including a power supply is connected to a remotely-located transmitter by a pair of conductors which both supply power to and convey the output signal from the transmitter. The transmitter draws current in a predetermined range for its operations; the amount of current drawn by the transmitter provides the output signal.

It is an object of the invention to provide a remotely-calibratable two-wire instrument system, in which a transmitter located at a vessel draws a current responsive to the level of materials within the vessel.

In many plant situations, the transmitters used for level sensing are not readily accessible. Therefore, it would be desirable to provide a calibrator for calibrating such a system which could be attached to the transmission line connecting the transmitter and receiver, preferably at any point thereof, to enable the maximum flexibility in calibration operations, and to provide such is an object of the invention.

Some prior art admittance-responsive measurement systems have included remote or automatic calibration schemes. Typically these have involved comparison of a variable signal, such as the admittance measured by a probe, to a fixed reference admittance, and adjustment of some circuit component until the actual admittance signal sensed by the probe bears a predetermined relationship to the reference signal which calibrates for an air capacitance as well as preload. Thereafter it is assumed that no further variation in the circuit takes place. It will be appreciated that this is not necessarily the best approach inasmuch as the reference admittance may not be correct, may itself drift over time, and, furthermore, that this does not permit ready variation of the reference admittance with variation in the materials, the level of which is to be measured, for example.

Accordingly, it is an object of the invention to provide a remotely-calibratable level-measuring system in which the reference admittance is established during a remotely-initiated calibration operation, by variation of the reference admittance compared to an actual admittance signal determined in response to the existence of a predetermined condition of the materials (for example, the materials being at a level beneath any probe used), such that the correct reference admittance is determined regardless of the characteristics of the material being measured.

Some prior art admittance responsive measurement systems are known in which a reference admittance is varied and compared to an actual admittance signal in a calibration operation in accordance with this object of the invention. However, other aspects of these systems are not as useful as would be desired. For example, it is usual to provide "preload" in level-measurement systems. "Preload" is the difference between the operating point admittance (i.e., the admittance at which an associated control system responds) and the air capacitance (i.e., the admittance sensed with respect to an empty vessel). Thus, for example, the instrument may detect an admittance of 20 pf when the materials are above the level of a probe in their vessel and 10 pf when the materials are well below the level of the probe. It would be desirable to set the instrument to change output states (e.g. to cause the vessel to be filled) at 15 pf (i.e., preload=5 pf)—which is halfway between the full and empty capacitances. This choice of operating point would minimize the possibility of false indications by the transmitter due to minor variations in characteristics of the material and due to transmitter performance variations over time. To date, all remotely calibratable instrument systems of which the present inventors are aware require selection of preload at the transmitter itself, thus defeating the aim of remote calibration.

It is therefore an object of the invention to provide a remotely-calibratable admittance responsive instrument system in which preload may be established remotely as well.

It is a further object of the invention to provide a remotely-calibratable admittance sensitive instrument system in which a number which corresponds to the value of reference admittance, once having been determined, is retained in non-volatile storage means, so that the instrument remains calibrated during power outages and the like.

In addition to the non-volatility of the stored calibration information, it would similarly be desirable if the calibration information was secure from tampering or from spurious environmental influences, and such is additionally an object of the invention.

It is a further object of the invention to provide a remotely calibratable instrument system in which the calibration operation is performed in as simple and foolproof a manner as possible.

It is an object of the invention, therefore, to provide a remotely-calibratable instrument system in which the calibration operation is accomplished automatically by the operator's pushing a single button (preload selection and calibration mode switches having been set), whereupon calibration is accomplished automatically with respect to a known predetermined condition of materials, such that a correct reference standard is derived for use in subsequent comparison to actual level signals, as opposed to systems in which it is assumed the reference signal is never to be varied.

It would be desirable if the same piece of calibrating hardware, used to initiate calibration operations in which a reference admittance is varied and compared to an admittance sensed with respect to a known condition, could be made useful for calibration of a number of such transmitters, so that the hardware costs could be shared over a larger system.

It is therefore an object of the invention to provide a remotely-calibratable admittance sensitive level measurement system, in which a calibrating device is adaptable to calibrating a large number of differing transmitters.

As mentioned above, it is desirable that the transmitter and receiver be connected by a two-wire transmission line. For simplicity's sake, it would be desirable if the calibrator could be detachably connected for calibration to the same two-wire line, preferably at any point between the transmitter and receiver, and such is accordingly an object of the invention.

The invention has been described heretofore in connection with a two-wire system in which two wires connect a receiver, comprising a power supply and load, and a transmitter, the calibrator being adapted to be attached to the pair of wires. It will also be appreciated by those of skill in the art that, in some circumstances, "receivers" are not necessary. Instead, the transmitter comprises means for controlling a local condition, e.g., a transmitter monitoring the level of materials in a vessel may comprise means for controlling the flow of materials into the vessel. Similarly, if the transmitter is used only for providing a condition indication, no discrete receiver is required. Further, the transmitter may be connected to a local power supply, such that it is not connected to a receiver by a two-wire system. Nevertheless, all such transmitters require calibration, and it would be desirable if the same calibrator used to calibrate such receiver/transmitter systems could be used to calibrate such receiverless systems.

It is accordingly an object of the invention to provide a remotely calibratable transmitter in a receiverless system. The term "receiverless system" as used herein, of course, includes a power supply although it does not otherwise include a receiver.

It will be appreciated that a calibration-enabling signal, sent from the calibrator to the transmitter to cause initiation of a calibration operation, must be distinguishable by the transmitter from noise, accidental short or open circuits and the like occurring in the transmission channel.

It is therefore an object of the invention to provide a remotely-calibratable instrument system in which a calibrator transmits an encoded calibration enabling signal and in which a transmitter is adapted to decode the encoded signal and initiate calibration operations in accordance therewith.

Having determined that remote calibration would be desirable, it is furthermore desirable that such a remote calibrator be as versatile and as useful as possible. For example, in the preferred embodiment, in a calibration operation, the variable capacitance used by the transmitter as the reference admittance is caused by the calibrator to be incremented through a number of predetermined steps; in each step, the reference capacitance is compared to the admittance sensed by the probe in response to a given condition of materials for detection of a predetermined relation therebetween. It would be desirable if the number of the step at which the varied reference admittance bore the predetermined relationship to the actual admittance were displayed on the calibrator in readable form for the use of the operator for future reference and, in some cases, to determine the appropriate preload. To provide such a display is an object of the invention.

Similarly, it would be desirable if the remote calibrator were adapted to cause the transmitter to transmit its setting to the calibrator, to enable confirmation of its setting at the correct reference admittance value, such that an operator could remotely calibrate a transmitter, make a note of the reference admittance value selected, and be able to return some time later and use the calibrator to cause the transmitter to output its reference level in order to check that the proper calibration value was set in the transmitter. Accordingly, provision of a remote calibrator with this capability is an object of the invention.

It would further be desirable to provide a remotely-calibratable instrument system in which the calibrator could be operated to cause the transmitter to vary its reference signal a predetermined amount from a known starting value, regardless of the conditions of materials in the vessel, and to provide such a system is accordingly a further object of the invention.

SUMMARY OF THE INVENTION

All of the above objects are met by the present invention.

In one of its forms the instrument system of the present invention comprises a power supply at one location and a two-wire transmitter at another location. The power supply and two-wire transmitter are connected by a pair of transmission lines. The transmitter includes an admittance-sensing probe for generating an input signal representing the sensed condition and corresponding admittance of materials, an admittance-responsive network coupled to that probe for comparing the input signal to a stored reference signal, and an output means coupled to the admittance-responsive network for generating an output signal based upon that comparison. The transmitter further includes an admittance-calibrating means which sequentially generates calibrating signals on demand. The admittance calibrating means is coupled to the admittance-responsive network such that the output means generates an output signal whenever a predetermined relationship exists between the input signal and one of these sequentially generated calibrating signals. Calibration enabling means, typically at a location remote from the transmitter, are coupled to the transmission lines. The calibration enabling means transmits enabling signals over the transmission lines for enabling the admittance calibrating means. Thus, in one form, the present invention employs remote calibration in a two-wire transmitter. Power to the transmitter and output signals from the transmitter travel on the same pair of transmission lines. Moreover, calibration enabling signals which direct the transmitter to begin a calibration operation also travel on these same transmission lines as does an output signal indicating that calibration has been achieved. The foregoing arrangement is desirable because only a single pair of transmission lines is needed for both operating and calibrating a given instrument.

Moreover, in accordance with an important aspect of the present invention, the calibration enabling means may be coupled to the single pair of transmission lines at any point between the transmitter and the power supply. Because level sensing transmitters are often at inaccessible locations which may be great distances from plant control rooms, the foregoing arrangement is particularly desirable in not only reducing wiring costs and difficulties, but in also making it simple and reliable to calibrate the instrument.

In accordance with another aspect of the present invention, the calibration enabling means includes means for transmitting calibration enabling signals to the transmitter, the transmitter being responsive to those calibration enabling signals by varying a stored reference signal and by comparison of that varied reference signal to the monitored condition signal. When a predetermined relationship exists between the monitored condition signal and the varied reference signal, the transmitter output so indicates to the calibration enabling means. The foregoing arrangement is particularly desirable because the instrument system of the present invention is calibrated against a varying reference signal which produces an error signal of zero amplitude when the predetermined relationship exists as opposed to a comparison of a fixed reference to an error signal of non-zero amplitude which may drift over time. In addition, in the foregoing arrangement, the output signal of the transmitter itself provides an indication to remote calibration means that the instrument is calibrated. Such an arrangement is desirable because the transmitter output not only indicates when calibration has been achieved, but further indicates that all portions of the transmitter are working properly.

In accordance with still another important aspect of the present invention, the calibration enabling means described above transmits an encoded calibration enabling signal to the transmitter to initiate a calibration operation. At the transmitter, the signal is decoded and compared against a stored reference before a calibration operation will begin. Such an arrangement is particularly desirable because it precludes the possibility of spurious environmental factors causing miscalibration of particular instruments.

Still another important aspect of the present invention resides in the fact that the calibration enabling means may be further adapted to detect variation in the transmitter output signal which indicates a predetermined relationship between a reference signal and the input signal indicating that calibration has been achieved, the calibration enabling means being further operative to continue to transmit calibration enabling signals until requisite preload has been established.

Still another important aspect of the present invention resides in the provision of a display means which provides an indication of the set point of a given instrument thereby providing the instrument operator with information as to the particular point at which a given instrument has been calibrated.

These and other objects of the present invention will be more fully understood by reference to the drawings and to the detailed description of those drawings which follow.

BRIEF DESCRIPTION OF THE DRAWINGS

The invention will be better understood if reference is made to the accompanying drawings, in which:

FIG. 5 comprising

DESCRIPTION OF THE PREFERRED EMBODIMENTS

Figure 1:
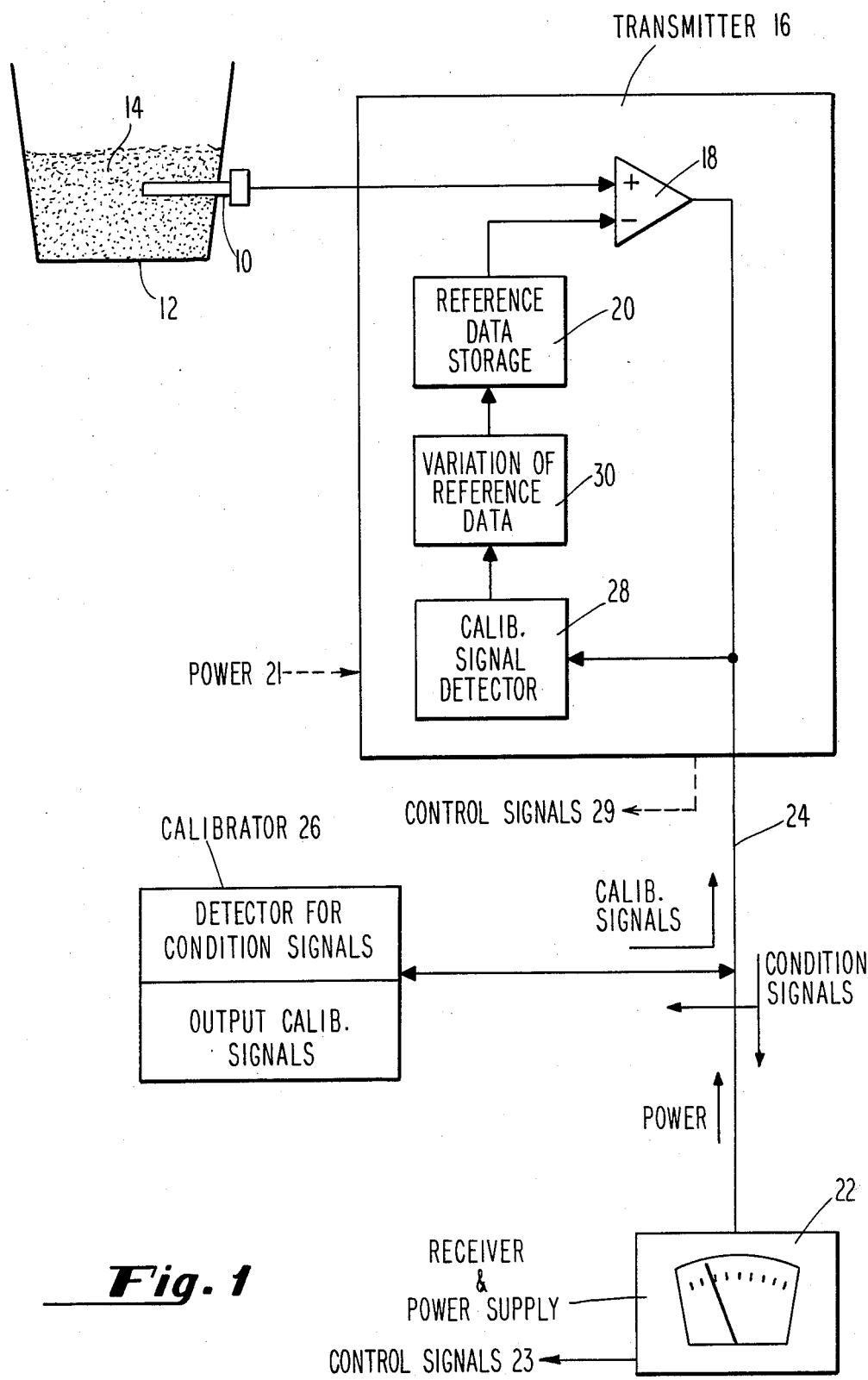
FIG. 1 shows an overview of the system of the invention in a broadly-described embodiment.

FIG. 1 shows the system of the invention in broad conceptual outline. A probe 10 is disposed in a vessel 12 containing materials 14, the level of which is to be measured. The nature of the materials may vary widely, including insulating or conductive liquids, or granular materials; similarly the shape of the vessel can vary widely. The probe as shown is generally disposed horizontally in order to provide a large change in admittance for a given level change when the material level is near the height at which the probe is mounted in the vessel. However, those skilled in the art will recognize that numerous of the teachings herein will have applicability to systems including vertically disposed probes, such as are commonly used for continuous level monitoring.

The signal sensed by the probe is supplied to a transmitter 16, at which it is compared by a comparator 18 to reference data stored at 20 which, according to the invention, is derived in a calibration operation. The output of the comparator, termed "condition signals", is transmitted to a receiver 22 which provides an output indication. As noted, the receiver 22, in the preferred embodiment, provides power to the transmitter; power is supplied over the same communication channel 24 over which the condition signals are transmitted. The receiver 22 also may output control signals indicated at 23. Typically these would operate a valve controlling the flow of additional materials into a vessel or the like. However, it will be appreciated that, in some systems, the transmitter itself may be enabled to output such control signals, as indicated in phantom at 29. Similarly, in such a circumstance, the transmitter would not be powered from a receiver but would have a separate power input 21. Operation of the calibrator 26, which will be described below, is similar in either case.

In the preferred embodiment, the receiver 22 detects output or "condition signals" from the transmitter 16 which are in the form of the bistable current signals. The receiver 22 outputs "normal" or "alarm" indications, e.g., by lighting panel lights or the like and outputs suitable control signals. Typically, where the transmitter 16 is monitoring the level of materials in a vessel, the "normal" indication will be given whenever the level of materials is below the probe, i.e., when the admittance sensed by the probe bears a predetermined relation to the stored admittance. The "alarm" indication will be given whenever the level of materials reaches the probe; typically, a control signal would be output, closing a valve controlling flow of materials into the vessel or the like. This is the most common type of on/off level system operation. In the present specification, this arrangement will be referred to as High-Level Fail-Safe (HLFS) operation and the operation of the preferred embodiment of the system or the invention is described accordingly. However, Low-Level Fail-Safe (LLFS) operation is also possible, in which the "alarm" signal will be given when the level of materials falls below the probe. A fail-safe select switch 77 is described below, enabling the system of the invention to be used in either way.

In the preferred embodiment a calibrator 26, which detects the condition signals output by the transmitter 16 and outputs calibration signals as required, is also connected to the communication channel 24. The calibration signals may be referred to as "calibration enabling signals" in discussion of the preferred embodiment since in this case the calibrator's output signals cause the transmitter to vary the stored reference admittance for comparison to an actual admittance. The transmitter 16 comprises means 28 for detecting the calibration enabling signals and means 30 for variation of the reference data in response thereto. In a calibration operation, then, the calibrator 26 outputs calibration enabling signals which cause the reference data stored at 20 to be varied by 30 and compared at 18 to the signal received from the probe 10, responsive to a predetermined condition of materials. Typically, for example, calibration will be initiated only when the materials 14 are below the level of the probe 10. Then the problem is finding the reference data which corresponds to the "air" capacitance and storing this, together with additional "preload" data, at 20. Thereafter, this stored reference data can be compared by comparator 18 to the input data received from the probe 10 and used in generation of the condition signals.

Figure 2:
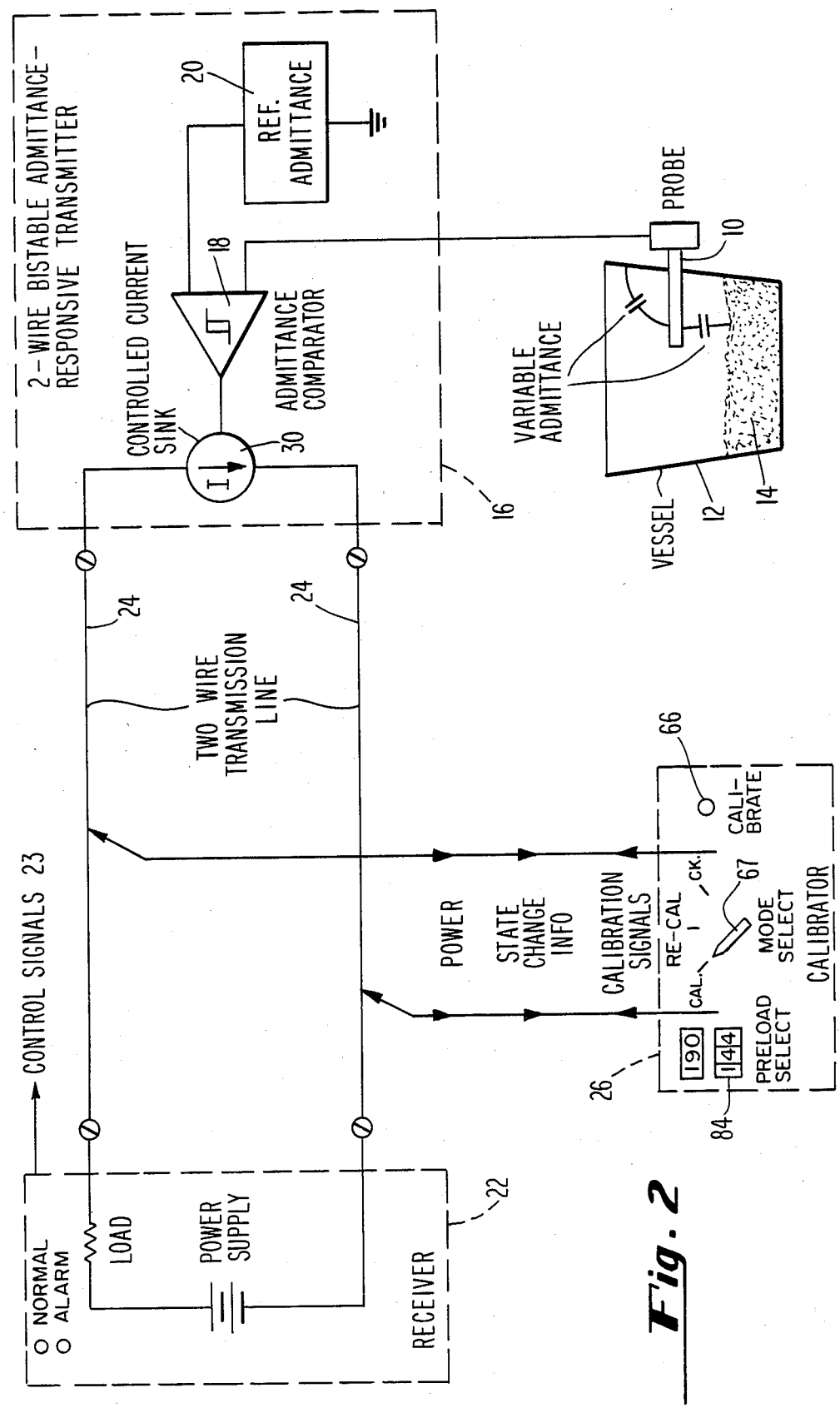
FIG. 2 shows the system of the invention in a two-wire embodiment.
Figure 8:
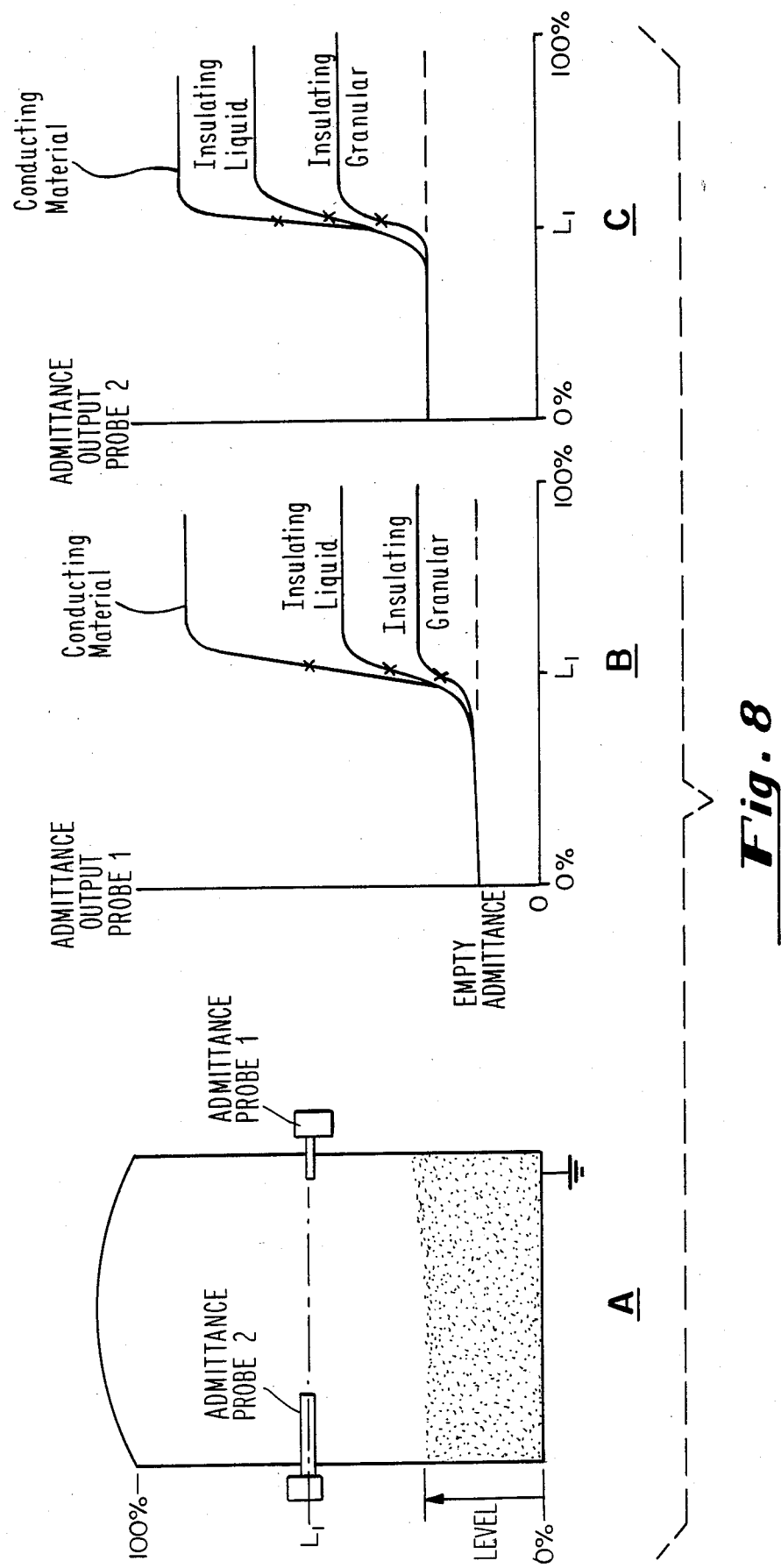
FIG. 8 shows certain diagrams for clarification of the way in which proper preload is determined.

FIG. 2 shows the block diagram of a two-wire on/off remotely-calibratable admittance measuring system according to the invention. The receiver 22 at one location comprises a power supply supplying power to a transmitter 16 which outputs bistable current signals, both over a two-wire transmission line 24. The receiver comprises means responsive to these current draw signals. The transmitter comprises a controlled current sink 30 and draws current in one of two ranges, depending upon whether the probe admittance detected by a probe 10 is above or below a reference admittance stored at 20. The comparison is made by an admittance comparator 18 to be detailed below. A load is interposed between the transmitter and power supply, to limit the current drawn during short circuits and to provide a voltage change across the transmission lines responsive to changes in the current drawn. The setpoint stored as the reference admittance at 20 is set by a calibrator 26 which is similarly attached to the transmission lines 24 for calibration at any point between the load and the transmitter. The response of the probe 10 to materials is determined by, among other things, the admittance of the probe when uncovered, as discussed below in connection with FIG. 8. In such a system, the instrument should be calibrated when the level of the material 14 is below the probe 10 in the typical horizontal configuration shown. Preferably, calibration is initiated by a pushbutton switch 66 in the calibrator. This causes the calibrator to provide a calibration enabling signal to the transmission line 24 and thus to the transmitter 16. The calibration enabling signal is a digitally encoded voltage change on the signal wires; in the preferred embodiment the calibration enabling signal is essentially an encoded sequence of short circuits across the signal wires, such as, for example, the sequence 1011001, where the "ones" represent short circuits and the "zeroes" represent the transmission line's usual characteristics; each bit of this code word may last 0.125 millisecond. The transmitter can be provided with sufficient energy storage to keep running during the brief intervals of the short circuits. The transmitter 16 detects the voltage changes on the signal wires and, if it recognizes the code, increments its setpoint by one step in a sequence of varying reference admittances. During this calibration operation, the transmitter continues to compare the varying reference admittance to the actual admittance signal, as in normal operation. Therefore, when the varied setpoint reaches a predetermined relationship to the air capacitance, the transmitter's current signal will then change state. This causes a voltage change across the load and hence a change of the voltage across the transmission lines. This voltage change is detected by the calibrator. After supplying the first coded calibration signal, the calibrator 26 waits a sufficient time for the transmitter 16 to respond; if no output change is detected, the calibrator applies another calibration enabling signal. This is repeated until the transmitter 16 responds by changing the state of its bistable output current. Having thus tuned the transmitter to the probe's air capacitance, the calibrator 26 applies a number of additional calibration enabling signals (the number of which is selected by the operator using preload selection switches 84) to the transmission lines to cause the transmitter to further increment its setpoint, thus providing preload. The amount of preload provided is chosen by the operator and is determined in accordance with the probe vessel geometry and the material characteristics. The calibrator may be operated in other modes discussed below, selected by mode switch 67.

Figure 3:
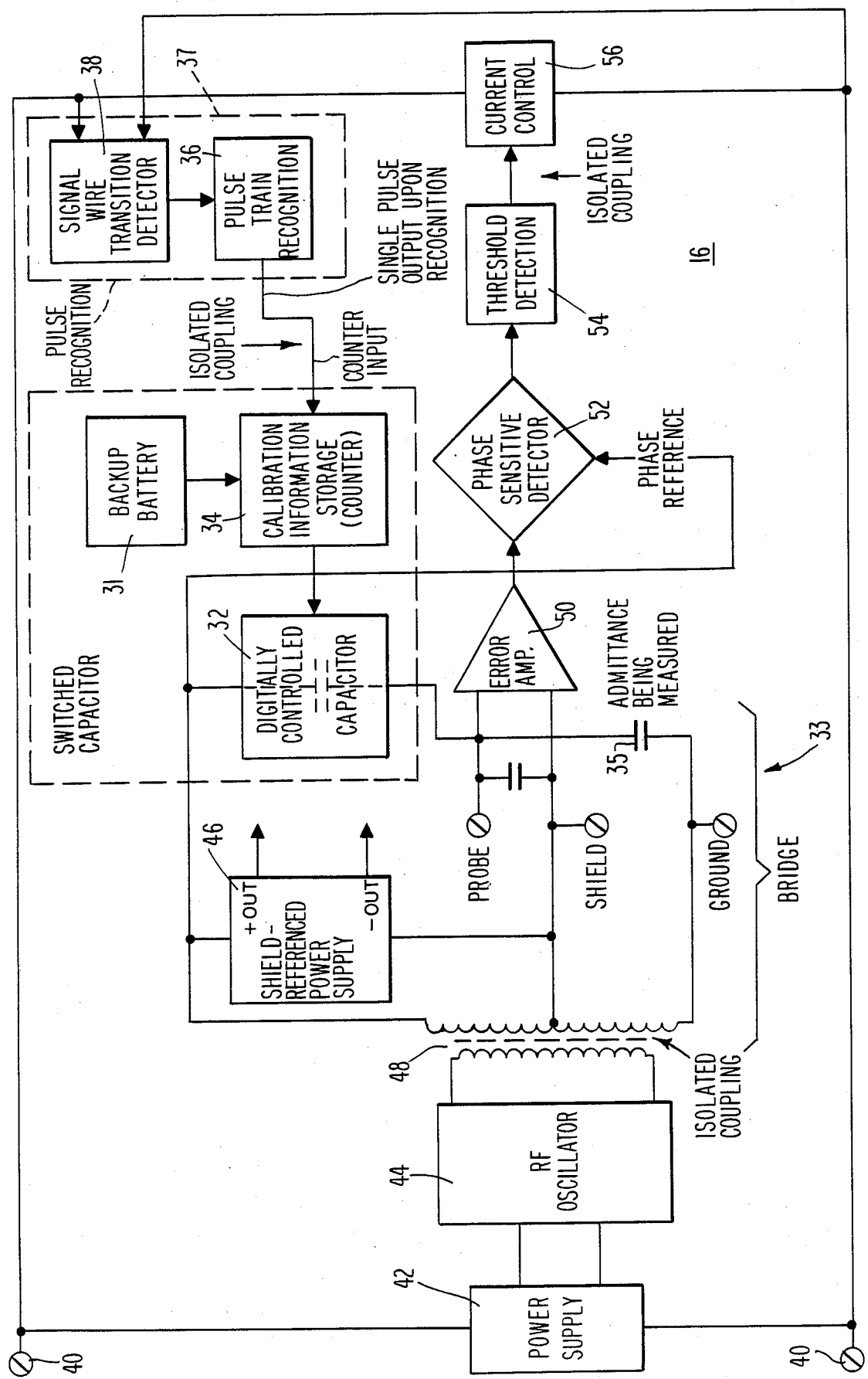
FIG. 3 shows a block diagram of a transmitter according to the invention.

FIG. 3 shows a detailed block diagram of the transmitter 16. The transmitter is generally a bridge circuit design, as discussed in commonly assigned U.S. Pat. Nos. 4,146,834 and 4,363,030 incorporated by reference herein. However, the transmitter of the invention incorporates a digitally controlled capacitor 32 in one leg of the admittance measurement bridge, indicated generally at 33, to set the value of probe-to-ground admittance at which the bridge will be balanced and therefore at which the bistable output of the transmitter will be switched. The effective value of the capacitor 32 is controlled by the value supplied by a digital counter 34 which thus stores the calibration information. The counter 34 is supplied with a back-up battery 31 in order to retain the count in the counter 34 in the event of loss of power. In order to calibrate the transmitter, the counter contents are incremented when a pulse recognition circuit 37, comprising a pulse train recognition circuit 36, for examining a received sequence of pulses and a signal wire transition detector 38, recognizes an encoded signal received from a calibrator 26 (FIG. 2) which, as discussed above, transmits such an encoded signal over the two wire transmission line which is connected to terminals 40. When the counter 34 is thus incremented, the digitally controlled capacitor 32 increments the reference capacitance compared to the capacitance sensed by the probe, shown in FIG. 3 at 35 as the admittance being measured.

The other elements shown on the drawing of FIG. 3 are generally conventional, and most are shown in applicant's previous patents referred to above, these including a power supply 42, a radio frequency oscillator 44, a shield-referenced power supply 46, a transformer 48 coupling the oscillator 44 to the bridge circuit 33, an error amplifier 50, a phase sensitive detector circuit 52 responsive to the bridge circuit 33, a threshold detector 54 and an output current control 56.

Figure 4:
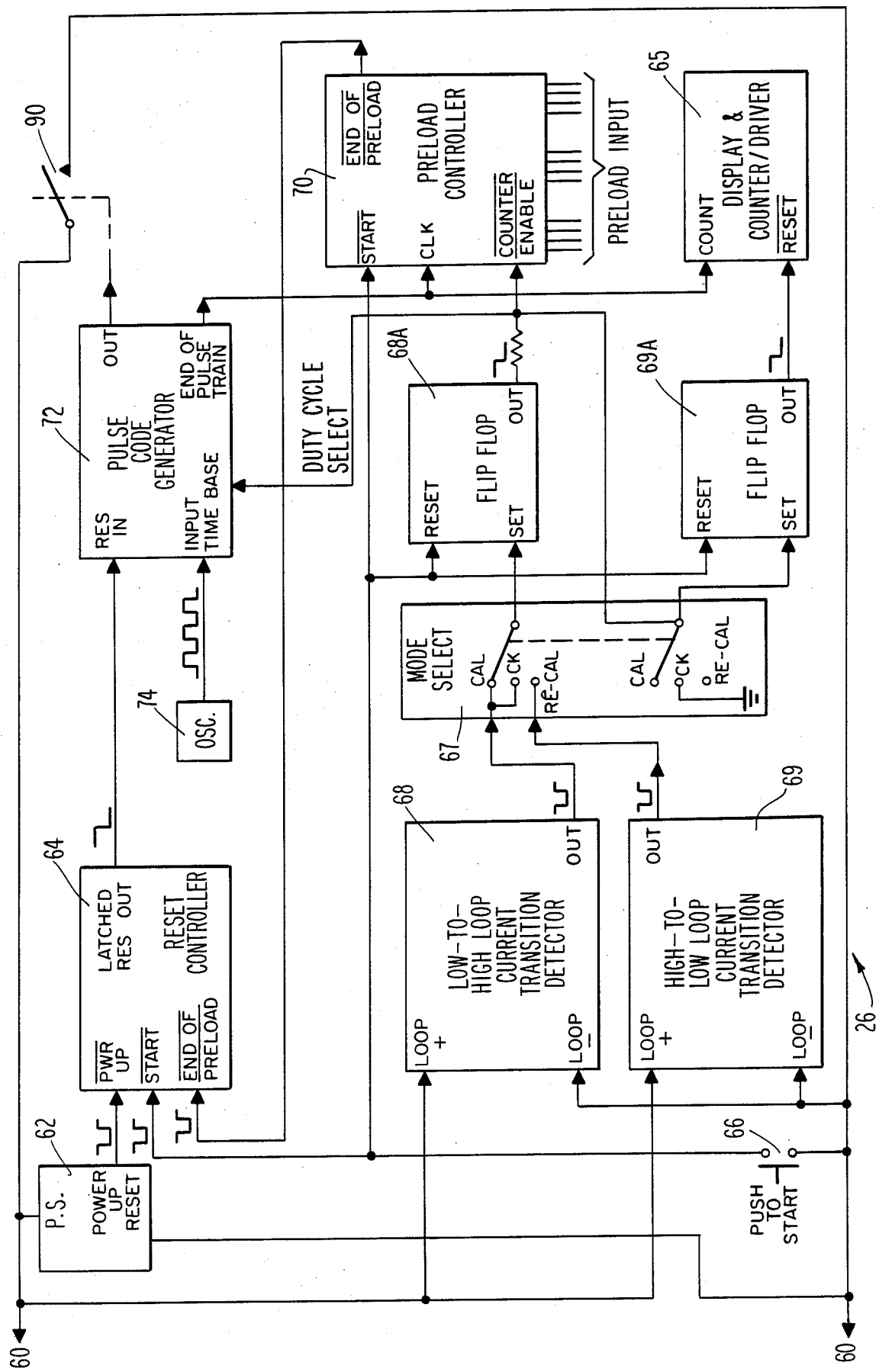
FIG. 4 shows a block diagram of a calibrator according to the invention.

FIG. 4 is a block diagram of calibrator 26. To eliminate the need for separate power input to the calibrator 26 and to simplify the calibrator connections, the calibrator 26 is adapted to be connected to the transmission lines 24 (FIG. 2) at terminals 60. A local power supply 62 provides a local regulated supply and a power-up RESET signal to initialize the circuitry when the calibrator is first attached to the transmission lines. The calibration sequence is controlled by a reset controller 64 and is initiated by a pushbutton switch 66. The reset controller prevents calibration enabling signals from being sent until a "start" button 66 is pushed. Pushing the button 66 causes the following actions. It resets the output latches 68A and 69A which disable a preload controller 70 and blank a display 65, the functions of which are discussed below. Two loop-current transition detector circuits 68 and 69 monitor the transmission lines 24 (FIG. 2) to detect changes in the state of the transmitter's bistable current output signal. At the same time, a user-preselected number ("PRELOAD INPUT") is loaded into preload controller 70 which will eventually determine the amount of preload. Pushing "start" button 66 changes the state of the reset controller 64, which then outputs the RESET signal to a pulse code generator circuit 72 which outputs a calibration enabling signal; as discussed above, in the preferred embodiment this is a sequence of short circuits across the transmission lines 24. Pulse code generator 72 provides the short circuits by closing switch 90 across the two-wire terminals 60. The sequence is controlled by counting and gating the output of an oscillator 74 to effectively generate the calibration enabling signal pulse train. These calibration enabling signal pulse trains are periodically generated at a duty cycle or repetition rate controlled by the output of the transition detector 68. While waiting for the transition of the transmitter's output signal to be detected, the repetition rate is relatively slow (e.g., 4 times per second). As noted above, the calibration enabling signals transmitted by the calibrator cause the digitally controlled capacitor 32 of the transmitter (FIG. 3) to increment its capacitance which is compared by bridge 33 to the admittance being measured. Eventually, when the varied reference signal bears a predetermined relationship to the actual admittance signal, the output of the threshold detector 54 changes state and the current controller 56 causes the transmitter's output signal to change state, which is in turn detected by the calibrator 26.

For reasons relating to versatility of use of the calibrator, which will be discussed more fully below in connection with FIG. 9, in the preferred embodiment, two loop current transition detectors 68 and 69 are provided. Detector 68 detects the low-to-high loop current transitions while detector 69 detects high-to-low transitions. Their outputs are latched by flip-flops 68A and 69A, respectively.

It should be understood that the following discussion assumes that the system is being operated in the high-level fail-safe mode as discussed above and assuming that the high current state corresponds to the normal condition state in the two-way embodiment. This will be the case throughout this specification unless distinctly indicated otherwise.

When the low-to-high loop-current transition detector 68 detects a transition indicating that the transmitter's adjusted setpoint has reached a predetermined relationship to the air capacitance value, the preload phase of calibration begins. The change of state of the output of the loop-current transition detector 68, latched by flip-flop 68A, DUTY CYCLE SELECT, speeds up the pulse code generator 72 to a higher rate (e.g., 16 times per second) and also enables the counter in the preload controller 70. At the start of the preload phase, this counter contains a user selected number indicative of the preload desired, i.e., a number ("PRELOAD INPUT") indicating the number of steps through which the digitally controlled capacitor is to be incremented for preload purposes. This counter is decremented by an "END OF PULSE TRAIN" signal provided by the pulse code generator 72 every time it transmits a calibration enabling signal. When the counter reaches zero—that is, when the desired number of calibration enabling signals have been transmitted—the preload controller 70 outputs an "END OF PRELOAD" signal which causes the reset controller 64 to generate a "RESET" signal to disable the pulse code generator 72. This completes the calibration sequence. FIG. 4 also shows the display 65, which shows the "step" at which the transmitter is currently set and its connections. This is discussed further below.

Figure 5A:
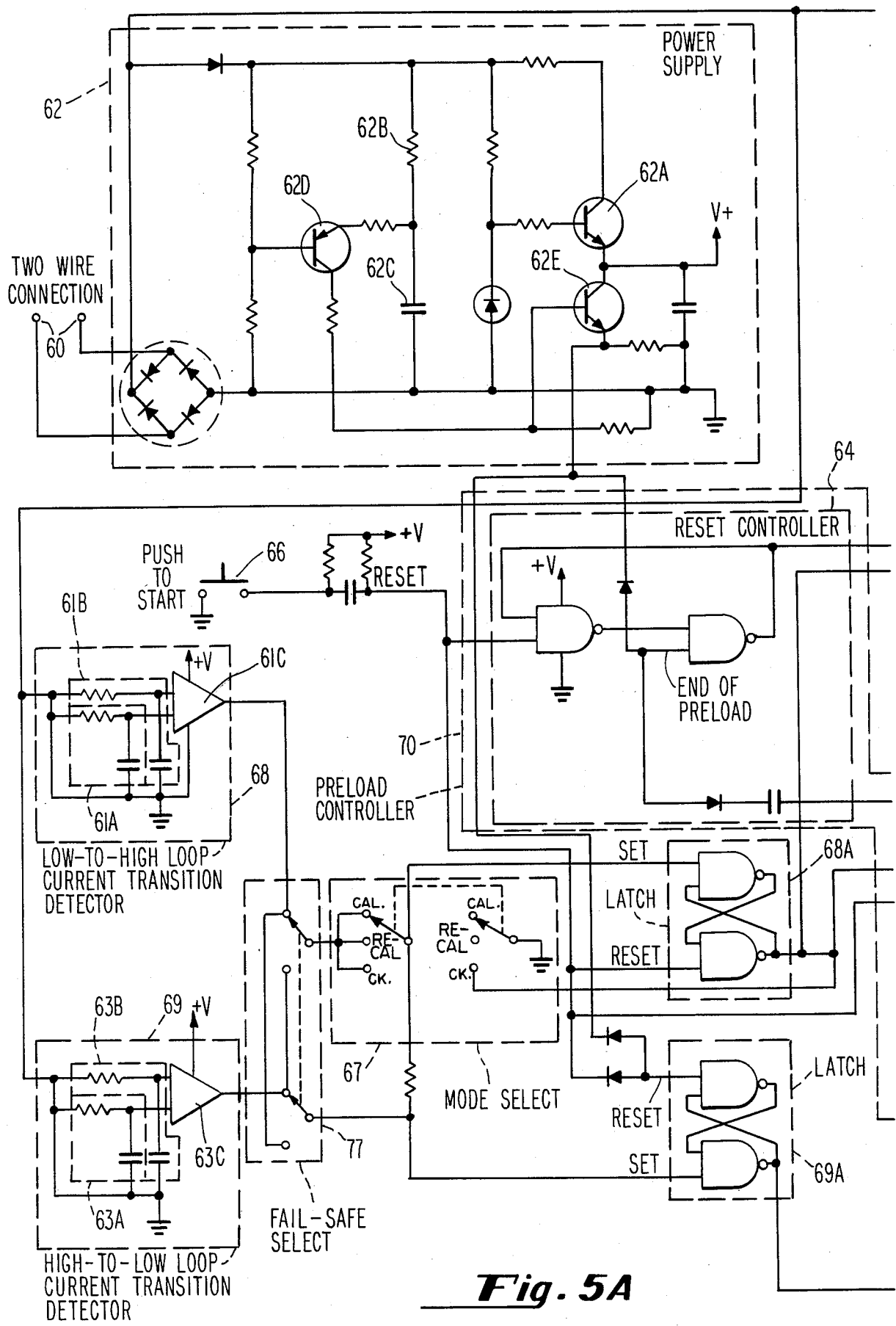
FIGS. 5a and 5b, shows the calibrator circuitry in detail.
Figure 5B:
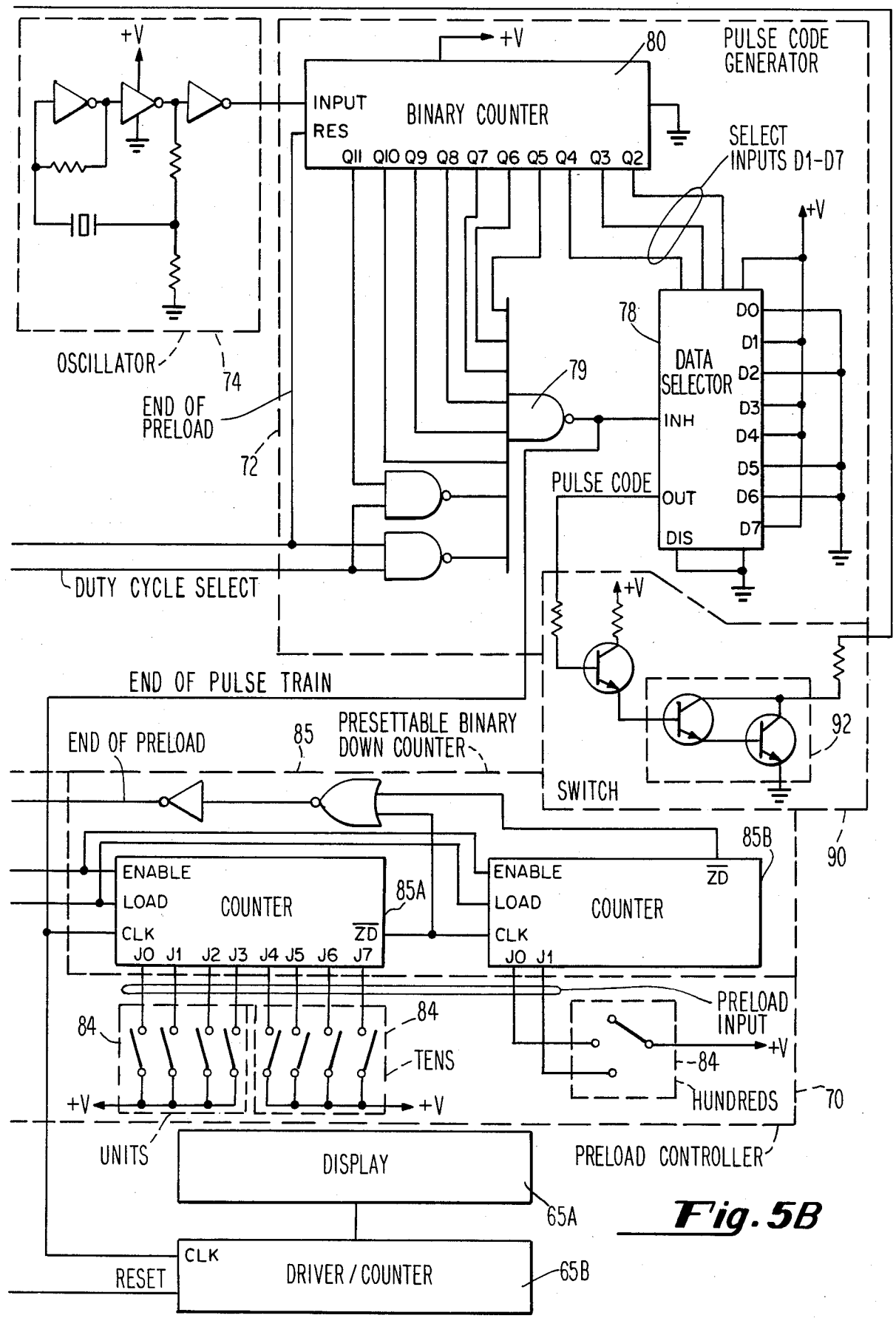

FIG. 5, comprising FIGS. 5A and 5B, shows the block diagram of FIG. 4 in greater detail, essentially depicting the circuitry of the calibrator 26. The two wire connection is made at terminals 60 and a full wave bridge eliminates polarity critical connection. A voltage regulating transistor 62A provides the correct voltage at terminal V+ to power the remainder of the circuit elements. In order to prevent premature sending of the calibration enabling signals, an R-C network, comprising a resistor 62B and a capacitor 62C, prevents transistors 62D and 62E from being turned on until the capacitor 62C is charged. Therefore, on power-up, the power supply 62 sends a pulse to the reset controller 64, which sends a latched reset signal to the pulse code generator, so as to prevent calibration enabling signals from being sent until the pushbutton 66 is depressed by the operator. Subsequently, pushing button 66 changes the state of the "latched reset out" of controller 64 and allows the pulse code generator 72 to begin sending calibration enabling signals. The pulse code generator 72 gates pulses received from the oscillator 74 in accordance with the data input of an 8-channel data selector 78, gated by a twelve-stage binary counter 80. Thus, the 8-channel data selector 78 provides the desired sequence of bits, as indicated by its input connections D0-D7, which are used to control the sequence of 0.125 millisecond short circuits across the transmission lines 24. The frequency of transmission of these sequences is controlled by the DUTY CYCLE SELECT signal which is output by the latch 68a of the low-to-high loop current transition detector 68. Again, this assumes high-level fail-safe operation. The end of transmission of each of the sequences of short circuits which comprise the calibration enabling signals is indicated by an "END OF PULSE TRAIN" signal output by a multi-input AND gate 79 connected to the outputs of the counter 80. This signal clocks the preload controller 70. The preload controller 70 comprises several switches 84 which may be binary-coded decimal switches as shown or any other desired type of selector switch. These are set by the operator to provide PRELOAD INPUT signals to two cascaded, presettable binary down counters 85a and 85b which count down the number of times selected by the two switches 84 to provide a predetermined amount of preload. Thus, this additional number of calibration enabling signals are sent out after detection by the low-to-high loop-current transition detector 68 of the change of state of the transmitter's output current. Preload ends when the binary down counters 85a and 85b reach zero, whereupon an "END OF PRELOAD" signal is sent to reset controller 64 which resets 12-stage binary counter 80, which then terminates transmission of the calibration enabling signals. The display 65A and associated driver, counter and latch circuitry 65B are clocked by the "END OF PULSE TRAIN" signal as well. The display, which is mounted on the housing of the calibrator so as to be visible to an operator, indicates the "step" in the calibration sequence (discussed in connection with FIG. 9) which the digitally-controlled capacitor has reached.

As shown in FIG. 5, the low-to-high and high-to-low loop current transition detectors 68 and 69 comprise voltage comparators 61C and 63C and paired R-C networks. By proper selection of the values of the resistors and capacitors in the R-C networks 61a and 61b, 63a and 63b, respectively, these filters can be arranged to ignore the voltage changes on the two-wire transmission lines due to the short circuits of the calibration signals while passing changes in the voltage across the load (FIG. 2) due to variation in the current drawn by the transmitter. In this way, transition detection may be effected by the voltage comparators 61C and 63C.

Item 77 is a fail-safe select switch. This switch enables selection of low-level fail-safe or high-level fail-safe operation. It amounts to a DPDT switch, which determines whether low-to-high or high-to-low transition detection enables the preload controller, enables the display and varies the duty cycle. The outputs of transition detectors 68 and 69 are supplied to a mode select switch 67. The mode select switch 67 allows operation of the calibrator in calibration, recalibration and check modes. These modes are discussed below in connection with FIG. 9.

The actual shorting of the two-wire transmission line which generates the calibration enabling signals is performed by switch 90 which comprises a Darlington pair 92 which essentially connects the two terminals 60 together in a sequence controlled by data selector 78 outputting the "PULSE CODE" signal. As noted, the calibration enabling signal typically comprises an encoded series, i.e., a predetermined sequence of 0.125 millisecond short circuits which can be examined by the transmitter so that the transmitter is prevented from varying the reference admittance in response to spurious signals on the transmission line.

Figure 6:
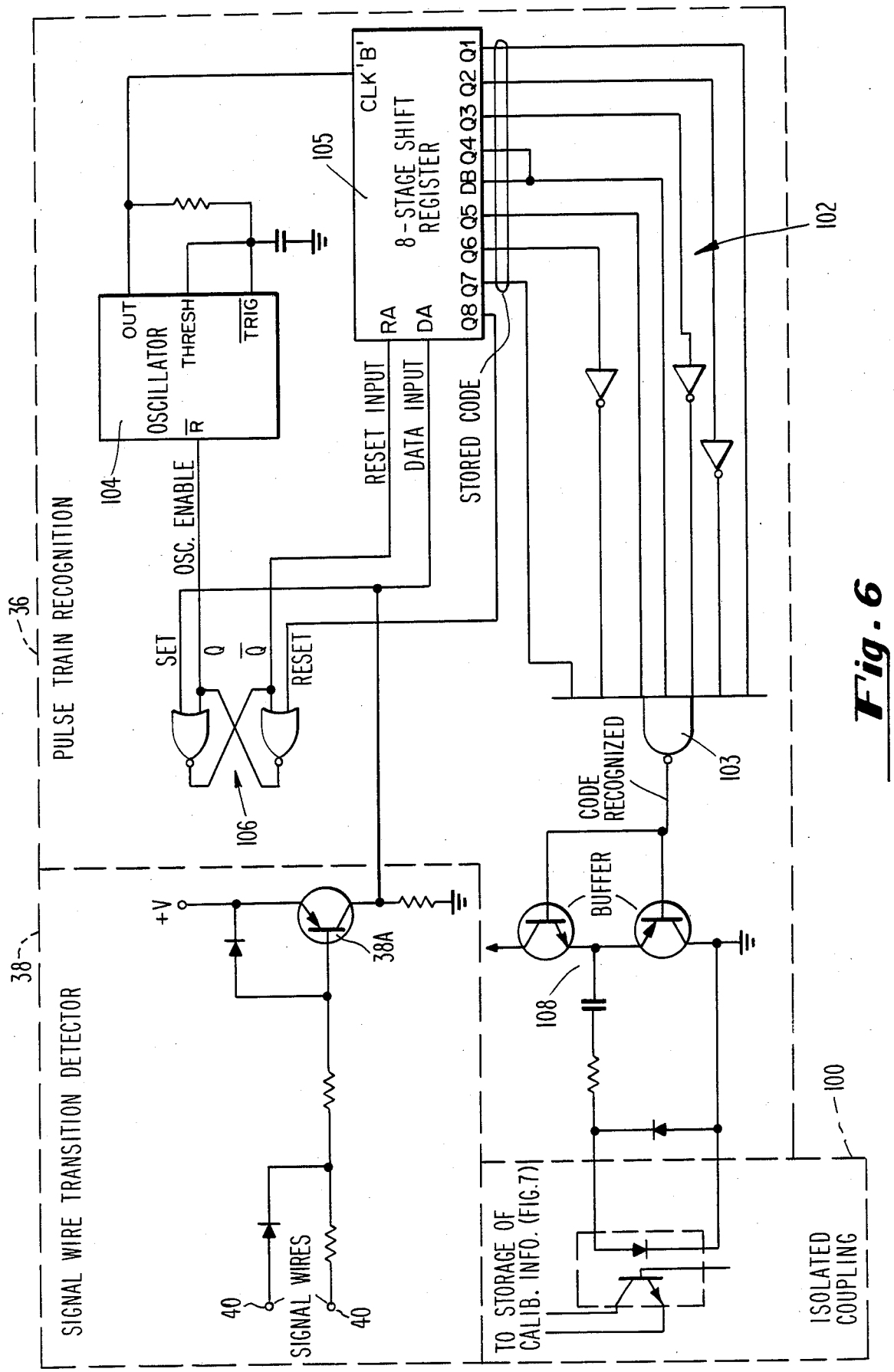
FIG. 6 shows a first portion of the transmitter circuitry.
Figure 7:
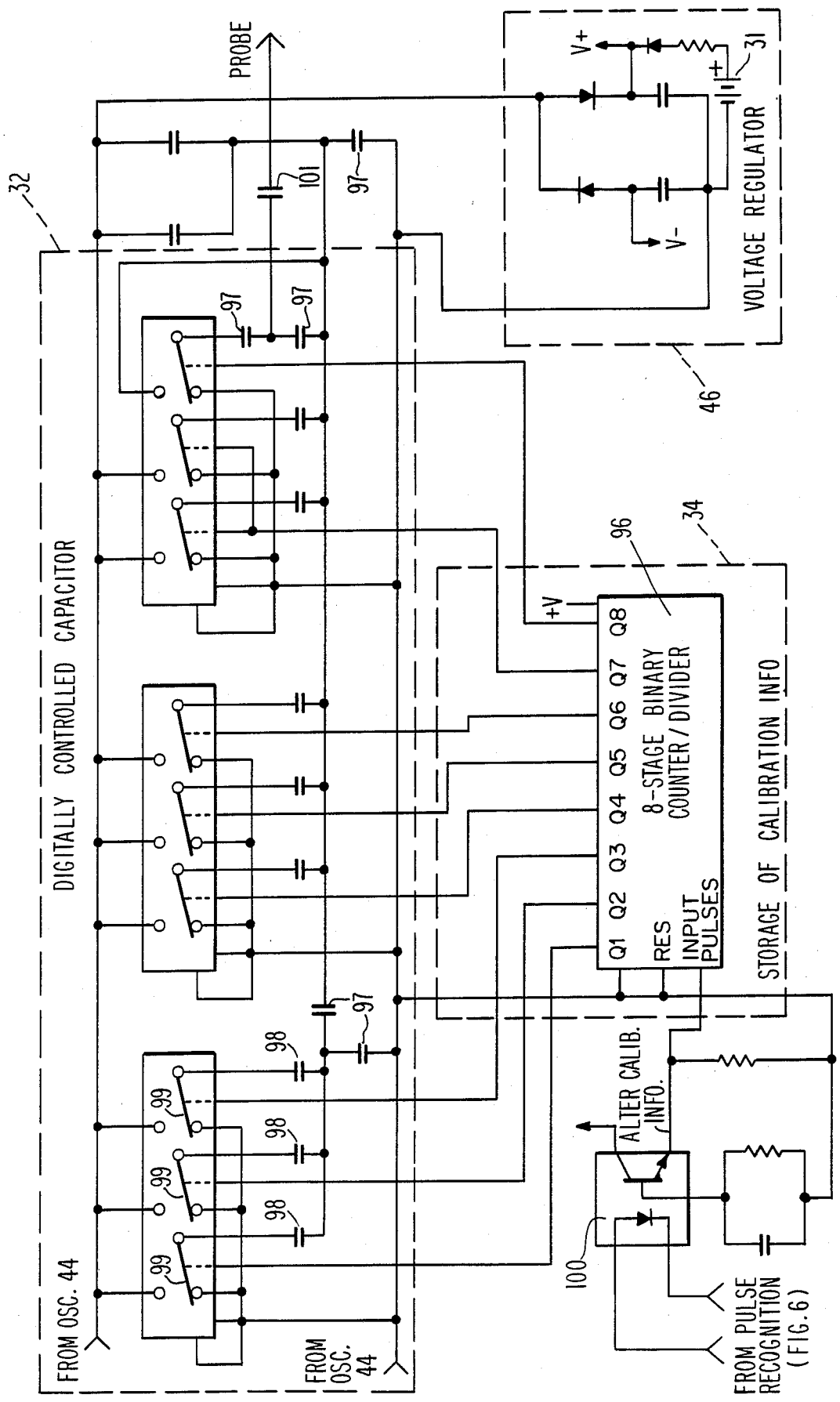
FIG. 7 shows a second portion of the transmitter circuitry.

FIGS. 6 and 7 show more detailed circuit diagrams of the novel portions of the transmitter circuit; the remainder of the block diagram circuit of FIG. 3, being in accordance with the commonly-assigned patents incorporated by reference above, is not detailed in FIGS. 6 and 7. In FIG. 7, a digitally controlled capacitor 32 is operated under the control of a binary counter/divider 96 which is the primary component of storage of calibration information block 34. The digitally controlled capacitor 32 comprises a number of capacitors 98 which can be connected in parallel by actuation of a like number of switches 99, typically FETs or the equivalent, which are controlled in turn by the output of eight-stage binary counter/divider circuit 96. This, in turn, is incremented by an "ALTER CALIBRATION INFORMATION" signal received from the pulse train recognition circuit 36 (FIG. 6) by way of an optical isolator pair 100 (duplicated on FIG. 6). Accordingly, upon receiving a signal from the pulse recognition circuit of FIG. 6, the optical isolator pair 100 sends an "ALTER CALIBRATION INFORMATION" signal to the eight-stage binary counter/divider 96 which increments its counter and controls the digitally controlled capacitor 32 to connect a different parallel combination of capacitors 98 across the connection to the rest of the bridge 33 (FIG. 3), which connections appear at the left of the digitally controlled capacitor 32. Voltage regulator 46 and battery 31, which ensure that a voltage V+ is always present at the binary counter/divider 96 so that it retains the calibration information (i.e., the positions of switches 99) during power outages and the like, are also shown in FIG. 7.

It will be recognized by those skilled in the art that the total range of capacitance to be detected by admittance-responsive measuring systems is on the order of only 40 pf. The smallest value of capacitor 98 used in the circuit of FIG. 7 is 10 pf because, for values below 10 pf, accuracy is not as good and the effect of stray capacitance is more significant. Accordingly, in order to subdivide the 40 pf total range into very small steps, e.g., 0.1 pf, it is necessary to attenuate the capacitance provided by the commercially available capacitors. Two attenuators, comprising a pair of capacitors 97 at the left side of the digitally controlled capacitor 32 and three more capacitors 97 at the right side, provide this function when connected as shown. These provide typically 100:1 attenuation of the leftmost three capacitors 98, thus resulting in the desired small step size of 0.1 pf.

A capacitor 101 is also shown in FIG. 7 in series with the probe. This provides some capacitance across the terminals of the transmitter so that it always "sees" some capacitance even when the terminals are shorted by conductive materials in the vessel.

FIG. 6 shows the pulse train recognition circuitry 36 in detail. The signal wire transition detector 38 connected to terminals 40 comprises a transistor 38A, which ordinarily does not conduct with line power supplied to terminals 40. When the terminals 40 are short circuited, however, the transistor 38A then conducts current from V+ toward ground. This pulse is passed to the pulse train recognition circuit as the "DATA INPUT" signal. Accordingly, the signal wire transition detector 38 outputs a "DATA INPUT" signal to the pulse train recognition circuitry 36 upon detection of a short circuit on the two-wire transmission line connecting the transmitter, calibrator and receiver. As discussed above, such short circuits are placed across the two wire line by the calibrator as calibration enabling signals. The oscillator 104 is enabled by an "OSCILLATOR ENABLE" signal passed from a pair of NOR gates connected for flip-flop operation at 106 and set by the first "DATA INPUT" signal; the oscillator 104 provides clock signals for synchronization of the incoming sequence of short circuits. Shift register 105 converts serial code received over the signal wires to parallel data. This output is then checked to see if it is good code, i.e., the appropriate sequence of shorts, by logic 102 and 103. The "CODE RECOGNIZED" signal output by the AND gate 103 is buffered by buffer transistors 108 from the isolated coupling 100, to which is connected the binary counter/divider 96 (FIG. 7). After the entire sequence of "DATA INPUT" signals has been supplied to shift register 105, the first "DATA INPUT" signal is shifted over to output Q8 of shift register 105 and resets the flip-flop 106; this disables oscillator 104 until the next incoming short circuit starts this sequence again.

FIGS. 8A, 8B and 8C explain selection of preload. The graphs of FIG. 8B and 8C show typical admittance output signals versus material level for two different probes, shown in FIG. 8A at the same height in the vessel, for various classes of materials. The empty admittance of the vessel is independent of the material but does vary with the probe size and shape, as well as with the configuration of the vessel and the proximity of any grounded members in the vessel such as agitators.

As shown in FIGS. 8B and 8C, for a given probe, the admittance change going from empty to full (for insulating materials) is related to the electrical properties of the material. In addition, the change for a given material is proportional to the empty admittance of the probe; that is, to the admittance sensed by the probe when the vessel is empty. The desired setpoints are indicated with an "X" on the various graphs. As shown, in general, the desired setpoint is about midway between the empty and full admittance values; this gives the best reliability, despite changes in the material's electrical properties or in the instrument.

In order to achieve these desired setpoints, one must include a component due to the empty admittance and a component due to the material's electrical properties. As mentioned above, in the presently preferred embodiment the amount of preload is determined by the operator manually setting switches 84 in the calibrator. It is possible however that, at some point, the desired preload may be determined by the calibrator itself. This could be done by having the calibrator determine the empty admittance component of the desired preload, by determining the number of calibration signals transmitted before the transmitter's bistable output changed state. To then determine the proper preload would require the operator only to input the material characteristics (e.g., to set a switch to "conductive", "insulating granular" or "insulating liquid" positions). Furthermore, the instrument could further be adapted to determine the material-related component of the desired preload by noting the admittance present when the material covers the probe for the first time, causing the transmitter's output to change state. The calibrator could then adjust the first approximation calibration which was determined as above and then automatically achieve the desired preload calibration. The operator in this case would be required to know nothing except to confirm that the vessel was empty when the calibration operation began. Reliable and obviously highly efficient calibration would thus be obtained. Such additional modifications are deemed to be within the scope of this invention.

It will be appreciated by those skilled in the art that what has been described may be referred to as a "blind" calibration operation in that one simply adds a predetermined preload value to the air capacitance rather than, for example, measuring the air capacitance, filling the vessel, measuring the filled capacitance and choosing some intermediate value as the setpoint. It is found by the applicants that such a blind calibration is quite effective where the setpoint is chosen properly, as explained in connection with FIGS. 8B and 8C. Moreover, of course, blind calibration is very advantageous in that one does not have to fill an empty vessel simply to calibrate the level measurement system; in many circumstances, this would be quite cumbersome, if not actually impossible. For this reason, the term "preload" has been used to refer to the difference between the setpoint and the air capacitance; the preload value is chosen by the operator when calibrating the instrument. In some circumstances, and according to others in the art, the term "setback" may also be used, although it is felt by the applicants that this may possibly imply a calibration of the type in which both air and full capacitances are measured and a value is established for the setpoint somewhere in between. However, description of the blind calibration operation herein, and use of the term "preload" in preference to "setback" herein, should not be interpreted to limit the invention except as required by the context; in fact, many of the teachings of the invention are quite applicable to systems in which both the empty and full capacitances are measured in calibration operations.

Figure 9:
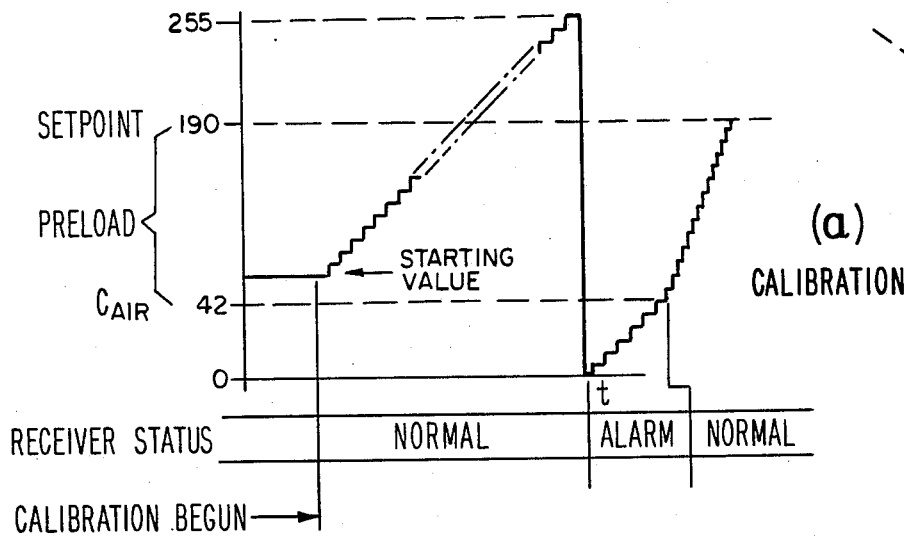
FIG. 9 shows diagrams illustrating the calibration, calibration check, and preload operations.
Figure 9:
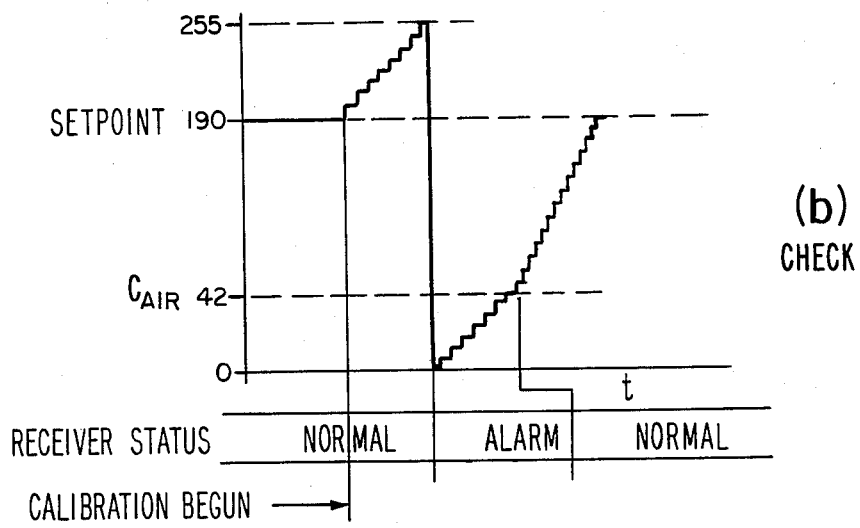
Figure 9:
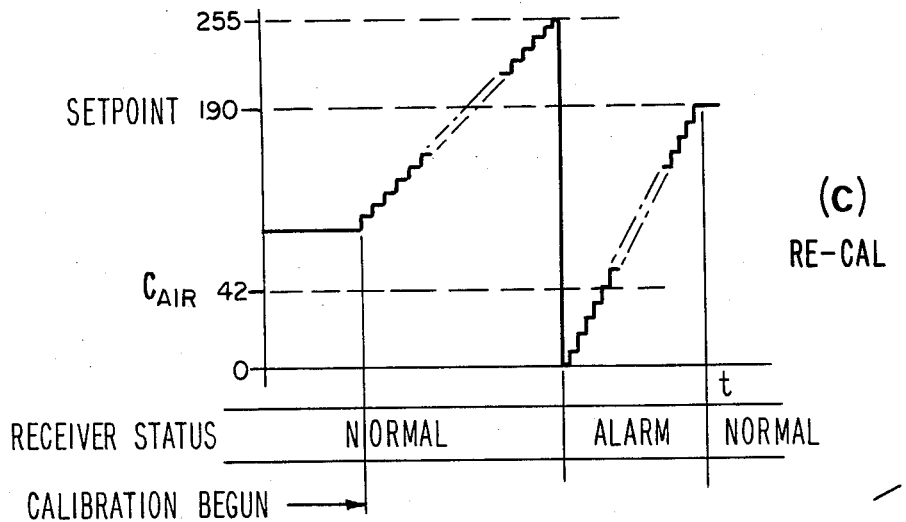

FIG. 9, comprising FIGS. 9(a)-(c), shows graphs of the capacitance of the digitally switched capacitor 32 in a transmitter versus time in calibration, calibration check and recalibration operations. In each case, the graph shows variation of the capacitance between a "zero" point and a 255 point. This refers to the division of a total variation in capacitance of some 40 pf provided by the digitally switched capacitor 32 into 256 steps, all controlled by the 8-stage binary counter/divider 96 of FIG. 7, operating the switches 99 which sequentially switch ones of 256 total combinations of capacitors 98 into the circuit. For example, in each of the graphs, the air capacitance $C_{AIR}$ is shown to be step 42, that is, the combination of capacitors of the digital capacitor 32 made at step 42 bears a predetermined relationship to the air capacitance, such that the bridge circuit is balanced. The transmitter's output changes state upon reaching this point. It is then presumed that an additional 148 steps are added as preload to reach a total setpoint at step 190. It should be appreciated that the steps are not necessarily linear so that, for example, the capacitance at step 100 will not necessarily be one-half that at step 200.

The "receiver status" indication below each of the diagrams indicates which of the "normal" and "alarm" signal lights shown in the receiver of FIG. 1 is lit. As a rule, in the preferred embodiment, in high-level fail-safe operation, whenever the capacitance sensed by the probe is less than the reference value provided by the switched capacitor, i.e., the level of materials in the vessel is below the probe, the "normal" display is given.

In the example given of calibration operations, FIG. 9(a), the capacitance initially provided by the digitally switched capacitor is shown to be somewhat above the air capacitance sensed by the probe. Upon initiation of calibration at the point marked "Calibration Begun" (upon pressing of the calibration start button 66), the reference capacitance provided by the capacitor is gradually incremented. Eventually it reaches its maximum value at step 255 and drops to zero on the next calibration enabling signal. The alarm light is then lit because the capacitance sensed, $C_{AIR}$, is greater than that then required to balance the digitally controlled capacitor. When the bridge subsequently balances at step 42, the alarm light goes off and the normal light is relit. A predetermined value for the preload may then be added. The amount added is selected by setting the switches 84 (FIG. 5). Here the amount of preload selected is 148 steps, resulting in a final setpoint at step 190.

Prior to the change in state of the transmitter's output upon the achieving of the predetermined relationship between the capacitance sensed and the varied reference admittance (step 42), at each step, the transmitter must compare the sensed admittance of the iteratively varied reference admittance. Hence, the iteration is at a relatively slow rate to allow the transmitter time to respond, e.g., 4/sec, controlled by the duty cycle of the sending of the "PULSE CODE" signals. Thereafter, during the addition of preload, the rate can be much faster, e.g., 16/sec, as no comparison is required. Hence the variation in the slope of the curve shown. The variation in duty cycle is controlled by the calibrator's detection of the change in the current drawn by the transmitter, performed by the high-to-low and low-to-high transition detectors 68 and 69, respectively, as discussed in connection with FIG. 5.

FIG. 9(b) shows the check operation, in which the operator confirms that the setpoint is indeed at the correct value. This might typically be done several weeks after calibration; for example, to verify that the original setpoint is still being retained by the transmitter. The operator will have recorded the preload value used in a notebook or the like, for use in such check operations. He selects the check mode and pushes the calibration button. In the check mode, the calibrator causes the transmitter to step through all 256 steps at once. Initially, the capacitance provided by the digitally controlled capacitor steps upwardly at the lower rate. It eventually reaches step 255 and drops to zero, causing the alarm light to be lit (in high-level fail-safe), and then is stepped up until the reference capacitance bears the predetermined relation to the sensed capacitance. If the vessel is, in fact, empty this will be when $C_{AIR}$ is reached. The rate will then increase until the setpoint at step 190 is reached as shown and the normal light is then relit. The display on the calibrator, which is controlled as noted by the "END OF PULSE TRAIN" signal output by the pulse code generator, will indicate this final setpoint value of 190, which will be the same as the recorded value if, in fact, the transmitter is properly calibrated.

Note in this connection that the display 65 on the calibrator, when it is initially attached to the signal lines, will be blank. However, when the high-to-low loop current signal transition detector 69 indicates that the transmitter output has changed state—that is, that step 255 has been reached and the transmitter is, therefore, now going to step 0—the display is set to correspond to the correct setting of the value, namely "zero". Thereafter, the display steps in accordance with transmission of the calibration enabling signals and therefore in accordance with the iteration of the digitally controlled capacitor, such that its final value at the conclusion of the calibration check is indeed the correct value for the step at which the digitally switched capacitor stops.

In the recalibration (re-cal) mode, FIG. 9(c), one sets the desired "re-cal" mode, sets the desired final setpoint on the switches 84 of the calibrator and presses the "start" button 66. This simply causes the digitally controlled capacitor to be set to this value by stepping upwardly the desired number of steps after "zero" has been reached. This is done, for example, where it is not convenient to empty the vessel for true calibration but where it is desired that a known setpoint be established. Accordingly, in this operation, one simply sets the mode switch to "re-cal" and selects the desired setpoint. In this example, one would set the switches 84 to "190". Upon the pressing the calibration button 66, the capacitance steps upwardly to step 255, drops to "zero" (lighting the "alarm" light) and then steps rapidly directly up to the setpoint of 190. In the "re-cal" mode, after the 255-to-0 transition is reached, one is not comparing the actual capacitance with the capacitance provided by the digitally-controlled capacitor so there is no need to increment the capacitance at the slower duty cycle rate.

It will be appreciated that there has been described a remotely-calibratable, admittance-responsive instrument system which satisfies the needs of the art and objects of the invention as above. By provision of a calibrator which outputs calibration enabling signals which cause the transmitter to repetitively increment its reference capacitance and to compare it to an actual admittance signal, all elements of the system are automatically calibrated at once, as opposed to a system in which the calibrating admittance were added to or subtracted from an actual sensed admittance being compared to a fixed reference admittance. Automatic inclusion of preload in the calibration operation has also been described. Further, it will be appreciated that the transmitter, calibrator and receiver may all be connected by a single two-wire transmission line and that both calibrator and transmitter are adapted to draw power from the receiver, thus further simplifying matters. Those skilled in the art will recognize that, while there has been described a preferred embodiment of an instrument system, further improvements and modifications thereto would be possible. Accordingly, the invention is not to be limited by the present exemplary disclosure by only by the following claims.

We claim:

1. A two-wire transmitter system comprising:
   a power supply at one location;
   a two-wire transmitter at another remote location connected to said power supply by a pair of transmission lines, the transmitter comprising:
   an admittance sensing probe for generating an input signal having a value representative of a sensed condition and corresponding admittance of materials;
   an admittance responsive network coupled to said probe for comparing said input signal to a reference signal;
   output means coupled to said admittacne responsive network for providing an output signal over said transmission lines whenever a predetermined relationship exists between the values of the input signal and reference signal; and
   admittance calibrating means coupled to said admittance responsive network for generating calibrating signals in response to receipt of enabling signals supplied by a remotely located calibration enabling means coupled to the transmission lines, the enabling signals being supplied to the transmitter over the transmission lines, the value of the reference signal being varied in response to generation of the calibrating signals to provide a new reference signal.

2. The system of claim 1 wherein said system further comprises:
a load; and wherein
said calibration enabling means is adapted to be coupled to said pair of transmission lines at any point between said transmitter and said load.

3. The system of claim 1 wherein said calibration enabling means comprises:
means for monitoring the output signal; and
means responsive to said monitoring means for determining when said predetermined relationship exists.

4. The system of claim 3 wherein said calibration enabling means further comprises:
means responsive to said determining means for adjusting said new reference signal whereby preload is provided for use in subsequent condition sensing operations.

5. The system of claim 1 wherein said calibration enabling means further comprises:
means for transmitting an encoded series of enabling signals over said transmission lines.

6. The system of claim 5 wherein said means for transmitting an encoded series of enabling signals further comprises:
means for applying a series of short circuits across said transmission lines.

7. The system of claim 1 wherein said output means further comprises:
means for controlling the output signal to take one of two states.

8. The system of claim 7 wherein:
said calibration enabling means is adapted to be connected to said pair of transmission lines at any point between said transmitter and said power supply.

9. The system of claim 7 wherein said calibration means comprises:
means for monitoring said output signal to detect a change in state thereof.

10. The system of claim 9 wherein said admittance calibrating means is responsive to said enabling signals for sequentially generating said calibrating signals.

11. The system of claim 10 wherein:
said calibration enabling means continues to supply calibration enabling signals to said admittance calibrating means and said admittance calibrating means continues to sequentially generate said calibrating signals until said calibration enabling means detects a change of state of said output signal.

12. A condition monitoring instrument system comprising:
a transmitter receiving an input signal having a value indicative of a particular condition; and
calibration enabling means for calibrating the transmitter, the calibration enabling means being located remotely from the transmitter and further being detachably connectable to the communication channel to establish communication between the transmitter and calibration enabling means, said calibration enabling means comprising:
means for transmitting calibration enabling signals provided by said calibration enabling means to said transmitter over said communication channel, said transmitter being responsive to receipt of said calibration enabling signals to vary the value of a reference signal stored in said transmitter, the transmitter comparing the varied reference signal to said input signal and transmitting an output signal to said calibration enabling means over said communication channel, the output signal indicating that the value of said varied reference signal bears a predetermined relationship to the value of said input signal;
means for monitoring said output signal; and
means for transmitting additional calibration enabling signals upon a change of state of the output signal transmitted by said transmitter.

13. The system of claim 12 wherein said output signal is bistable and wherein said transmitter further comprises:
means for changing the state of said bistable output signal in order to indicate a change in the relationship between the reference signal and the input signal.

14. The system of claim 13 further comprising:
a receiver adapted to be connected to said communication channel, said receiver including means for responding to said bistable output signal transmitted by said transmitter.

15. The system of claim 14 wherein said communication channel comprises:
a two-wire transmission means connecting said transmitter and said receiver.

16. The system of claim 15 wherein:
said communication enabling means is adapted to be coupled to said two-wire transmission means at any point between the transmitter and the receiver.

17. The system of claim 16 wherein said bistable output signal comprises:
a bistable current signal.

18. The system of claim 17 wherein said calibration enabling means comprises:
means for transmitting a series of encoded calibration enabling signals on said two-wire transmission means.

19. The system of claim 18 wherein said series of encoded calibration signals further comprises:
a series of short circuits across said two-wire transmission means.

20. The system of claim 19 wherein said transmitter further comprises:
means for responding to said encoded calibration enabling signals.

21. The system of claim 20 wherein said means for responding further comprises:
means for decoding said encoded signals; and
means for comparison of said decoded signals to a stored reference.

22. A two-wire transmitter system comprising:
a power supply at one location;
a two-wire transmitter at another remote location;
a pair of transmission lines connecting said power supply and said transmitter for carrying a signaling current; and
a calibrator remote from said transmitter, said transmitter comprising:
an admittance sensing probe for providing an admittance related input signal to the transmitter;
an admittance responsive network coupled to said probe for said determining the relationship between said input signal and a setpoint;

output means coupled to said admittance responsive network for providing said signaling current on said pair of transmission lines, said signaling current being indicative of the relationship between the input signal and the setpoint, said calibrator being detachably connectable to said pair of transmission lines for communicating calibration enabling signals to said transmitter on said transmission lines, the transmitter being responsive to receipt of said enabling signals to vary the setpoint.

23. The system of claim 22 wherein said output means further comprises:
means for nonvolatile storage of said setpoint.

24. The system of claim 22 wherein said calibrator further comprises:
means for monitoring the signaling current.

25. The system of claim 24 wherein said calibrator further comprises:
means for causing said setpoint to be further varied in order to provide preload for subsequent operations.

26. The system of claim 22 wherein said calibrator comprises:
means for superimposing said setpoint calibration enabling signals on said signaling current on said transmission lines.

27. The system of claim 26 wherein said means for superimposing comprises:
means for placing an encoded series of short circuits across said pair of transmission lines as said setpoint calibration enabling signals.

28. A remotely calibratable instrument system comprising:
a transmitter;
an admittance sensitive probe coupled to the transmitter;
a calibrator remotely located from the transmitter;
a receiver; and
a bi-directional communication channel coupling said transmitter, said calibrator and said receiver;
said calibrator comprising means for supplying calibration enabling signals over said communication channel to said transmitter; and
said transmitter comprising:
admittance sensing means for generating a signal representing the admittance sensed by said probe;
admittance calibrating means responsive to receipt of said calibration enabling signals for generating signals representing calibrating admittances;
admittance determining means for determining whether said signal representing the sensed admittance bears a predetermined relationship to one of said signals representing calibrating admittances; and
output means responsive to the determination made by the admittance determining means for generating an output signal over said communication channel indicative of the relationship between said sensed and calibrating admittance signals.

29. The system of claim 28 wherein said transmitter further comprises:
means for storing a reference admittance signal corresponding to said one of said signals representing calibrating admittances for comparison to the sensed admittance signal.

30. The system of claim 28 wherein:
said transmitter varies said one signal representing a calibrating admittance for comparison to the sensed admittance signal in response to said calibration enabling signal.

31. The system of claim 28 wherein:
said output signal is a bistable signal.

32. The system of claim 31 wherein:
said bistable signal is a current signal.

33. The system of claim 32 wherein:
said calibration enabling signals are voltage signals impressed across said communication channel.

34. The system of claim 33 wherein said calibrator further includes:
means for encoding said calibration enabling signals.

35. The system of claim 28 wherein:
said calibrator is adapted to be coupled to said communication channel at any point thereof.

36. A method of selectively operating an admittance responsive transmitter in an operational mode and in a calibration mode, wherein operation in said operational mode comprises the steps of:
providing an admittance signal indicative of a sensed condition;
comparing the admittance signal with a reference signal; and
generating a first output signal indicative of the result of said comparing step; and
wherein operation in said calibration mode comprises the steps of:
remotely varying said reference signal;
comparing said varied reference signal to the admittance signal for a known physical condition;
determining a new reference signal as a result of said comparison of the varied reference signal to the admittance signal for a known physical condition;
generating a second output signal indicative that said new reference signal has been determined; and
transmitting said second output signal to a remote calibration means, said output signal generated in said calibration mode being identical to said output signal generated in said operational mode.

37. The method of claim 36 in which the step of varying said reference signal in said calibration mode is controlled by calibration enabling signals received from a remote calibrator means.

38. The method of claim 36 in which said second output signal is bistable.

39. The method of claim 38 further comprising the step of:
monitoring said bistable output signal with said calibrator means.

40. The method of claim 39 further comprising the step of:
repetitively generating calibration enabling signals with said calibrator means causing said transitter to vary said reference admittance signal until said remote calibrator means detects that said monitored output signal has changed state.

41. An admittance responsive instrument system comprising:
a transmitter coupled to a probe for generating an admittance signal responsive to an admittance sensed by said probe, said transmitter comprising:
means for storing a reference signal;
means for comparing said admittance signal to said reference signal;

means for determining the value of said reference signal in a calibration operation;
the system further comprising:
a receiver having a power supply coupled to said transmitter; and
a calibrator remote from said transmitter for supplying an encoded signal to said transmitter, said transmitter further including means for receiving said encoded signal and for initiating calibration operation thereupon to cause the value of the reference signal to be remotely varied.

42. The system of claim 41 wherein said means for determining said reference signal in a calibration operation further comprises:
means for varying said reference signal for comparison to the admittance signal when the materials are in a predetermined condition;
means for determining when said varied reference signal and the admittance signal bear a predetermined relationship to one another; and
means for storing a new reference signal determined in accordance with said varied reference signal at that time.

43. The system of claim 42 wherein said transmitter further comprises:
means for generating and transmitting output signals responsive to the comparison between the reference signal and the admittance signal; and
wherein said calibrator further comprises:
means for monitoring said output signals transmitted by said transmitter during a calibration operation and for transmitting encoded calibration signals to said transmitter until said output signals indicate that siad varied reference signal has reached said predetermined relationship to the admittance signal generated responsive to the admittance sensed by said probe.

44. The system of claim 41 wherein:
said receiver and said calibrator are connected to said transmitter by a communication channel.

45. The system of claim 44 wherein said communication channel comprises:
a two-wire transmission line.

46. The system of claim 45 wherein: said output signals are current signals.

47. The system of claim 46 wherein: said encoded calibration signals are a series of short circuits across said two-wire transmission line.

48. A system for detecting the condition of materials comprising:
an admittance sensitive probe providing a signal responsive to a condition of materials;
a transmitter coupled to said probe;
a communication channel coupled to said transmitter;
a receiver coupled to said communication channel;
said transmitter comprising:
means for storage of a variable reference signal;
means for comparison of said reference signal to the signal provided by the probe;
means for generating output signals indicative of the relationship between the reference signal and said signal provided by the probe; and
means for transmitting the output signal over the channel;
the system further comprising:
a calibrator remotely located from the transmitter and detachably connectable to said communication channel for receiving said output signal and for transmitting calibration enabling signals to said transmiter in response to said output signals, the transmitter being responsive to receipt of said calibration enabling signals to vary the value of the reference signal.

49. The system of claim 48 wherein said calibration enabling signals comprise:
encoded signals.

50. The system of claim 49 wherein said transmitter further comprises:
means for decoding said encoded calibration enabling signals.

51. The system of claim 50 in which said calibrator further comprises:
means for generating said encoded calibration signals, said encoded calibration signals including a predetermined sequence of short circuits imposed across said communication channel.

52. A transmitter for an admittance responsive instrument system comprising:
a probe coupled to said transmitter for sensing admittance;
means for storing a reference setpoint;
comparison circuit means for comparing the reference setpoint and the admittance sensed by the probe;
means for generating output signals responsive to an output provided by said comparison circuit means and for transmitting said output signals over a communication channel; and
means responsive to a remotely generated calibration enabling signal for varying the setpoint supplied to said comparison circuit means by a predetermined amount and for storing the varied setpoint.

53. The transmitter of claim 52 wherein the system comprises:
calibrator means detachably connectable to said communication channel for generating said calibration enabling signals for transmission to said transmitter.

54. The system of claim 53 further comprising:
a receiver coupled to said communication channel.

55. The system of claim 54 wherein:
said communication channel is a two-wire transmission line.

56. The system of claim 55 wherein said output signals are bistable.

57. The system of claim 56 wherein said output signals are bistable current signals and wherein said calibrator further comprises:
means for generating calibration enabling voltage signals across said transmission line.

58. The system of claim 57 wherein said calibrator comprises:
means for generating and transmitting a predetermined sequence of short circuits across said two-wire transmission line as encoded calibration enabling signals, and wherein said transmitter comprises:
means for decoding said encoded calibration enabling signals.

59. The system of claim 58 wherein:
said calibrator is adapted to be coupled to said two-wire transmission line at any point thereof.

60. A remotely calibratable instrument system comprising:
a transmitter adapted to be connected to a communication channel comprising:

first means responsive to a remotely generated calibration enabling signal for varying a reference signal in a calibration operation;
second means for comparing said reference signal to an input signal received from a probe and indicative to a condition of materials; and
third means responsive to an output provided by said second means for transmitting an output signal on said communication channel indicating that the reference signal bears a predetermined relationship to the input signal;
the system further comprising:
a calibrator connectable to said communication channel at a location remote from said transmitter, and operable in a calibration mode, comprising:
fourth means for transmitting the calibration enabling signals to said transmitter over said communication channel;
fifth means for detecting said output signal transmitted by the transmitter; and
sixth means for transmitting additional calibration enabling signals after detection of said output signal by said fifth means for causing said reference signal to be further varied for comparison to input signals received in subsequent operations by said transmitter.

61. The system of claim 60 wherein:
said reference signal is iteratively varied by said transmitter upon receipt of calibration enabling signals from said calibrator.

62. The system of claim 61 wherein:
said reference signal is iteratively varied in a range extending from a minimum value to a maximum value for comparison to an input signal received from a probe.

63. The system of claim 62 wherein:
said calibrator is further operable in a check mode, said calibrator further comprising:
means for transmitting calibration enabling signals in order to cause said transmitter to iteratively vary the reference signal through its full range.

64. The system of claim 63, wherein said calibrator comprises:
display means for providing an operator-readable display indicative of the final value of said reference signal reached by said varied reference signal after iteration through said full range.

65. The system of claim 64 wherein said calibrator comprises:
means for detecting the point in said full range of variation of said reference signal at which said reference signal goes from its maximum value to its minimum value; and
means for controlling said display means responsive thereto.

66. The system of claim 65 wherein said output signal transmitted by said transmitter is a bistable output signal and wherein said calibrator comprises:
means for detecting changes in state of said bistable output signal.

67. The system of claim 62 wherein said calibrator is further operable in a recalibration mode, said calibrator further comprising:
means for transmitting calibration enabling signals in order to cause said reference signal to be iteratively varied from its minimum value up to a predetermined setpoint value.

68. The system of claim 60 wherein:
said means for transmitting an output signal transmits bistable output signals on said communication channel indicative of whether the reference signal bears one of two predetermined relationships to the input signal, and wherein said calibrator comprises:
means for detecting changes in state of said bistable output signals.

69. The system of claim 68 wherein said bistable output signals are current signals, and wherein said calibrator comprises:
means for differentiating between high-to-low current transitions and low-to-high current transitions of said current signals on said communication channel.

70. The system of claim 69 wherein said calibrator comprises:
display means adapted to indicate that the varied reference signal has been set to its minimum value upon detection of a high-to-low current transition, and to indicate that the varied reference signal has reached a predetermined relationship to the input signal upon detection of a low-to-high current transition.

71. The system of claim 69 wherein said calibrator further comprises:
display means adapted to indicate that the varied reference signal has been set to its minimum value upon detection of a low-to-high current transition and to indicate that the varied reference signal has reached a predetermined relationship to the input signal received upon detection of a high-to-low current transition.

72. A remotely calibratable instrument system comprising:
a calibrator including means for transmitting calibration enabling signals;
a probe; and
a transmitter, said calibrator and said transmitter being detachably and remotely connectably by a communication channel, said probe being connected to said transmitter, said transmitter comprising:
means for varying a reference signal stored in the transmitter through a range of variation in response to calibration enabling signals transmitted over the communication channel;
means for comparing said reference signal to an input signal received from said probe; and
means responsive to said comparison for transmitting a variable output signal over the communication channel;
said calibrator having means for detecting variations said output signal that are indicative of a predetermined relationship between said reference signal and said input signal, said calibrator being operable in a calibration mode in which said calibrator transmits calibration enabling signals over said communication channel causing said transmitter to further vary said reference signal after detection of variation in the output signal, whereby preload is established for measurement operations.

73. The system of claim 72 wherein said calibrator is further operable in a check mode, in which said calibrator transmits calibration enabling signals so as to cause said transmitter to vary the reference signal through its entire range of variation.

74. The system of claim 72 wherein said calibrator is further operable in a recalibration mode, in which said calibrator transmits calibration enabling signals so as to cause the transmitter to set the reference signal to a specified value.

75. The system of claim 72 wherein said calibrator further comprises:
display means for indicating the point in said range of variation of said reference signal at which said transmitter terminates variation of the reference signal, thus indicating its setpoint.

76. The system of claim 72 wherein said calibrator further comprises:
switch means for selecting a number corresponding to a desired setpoint; and
means responsive to said switch means for transmitting an appropriate number of encoded calibration enabling signals to said transmitter, in order to cause said transmitter to vary said reference signal so as to be set to the desired setpoint.

77. The system of claim 72 wherein:
said calibration enabling signals are encoded signals and wherein said transmitter further comprises:
means for decoding said encoded calibrationi enabling signals; and
means for varying said reference signal responsive to said means for decoding.

78. The system of claim 77 wherein said output signals transmitted by said transmitter are bistable signals and wherein said calibrator further comprises:
means for detecting a change in state of said bistable signals and for responding thereto, the response of said detecting means varying in dependence on whether said calibrator is operated in the calibration, check or recalibration mode.

79. A remotely calibratable admittance responsive instrument system comprising:
a transmitter and an admittance sensitive probe connected to said transmitter in a first location;
a receiver in another location;
a communication channel connecting the transmitter and the receiver; and
a calibrator detachably connectable to the communication channel at a location remote from the transmitter, said transmitter comprising:
means responsive to calibration enabling signals supplied by the calibrator over said communication channel for supplying a variable reference admittance to the transmitter;
bridge circuit means for comparing said reference admittance to an admittance signal provided by said probe; and
means responsive to said bridge circuit means for transmitting an output signal indicative that the reference admittance bears a predetermined relationship to the admittance sensed by the probe.

80. The system of claim 79 wherein said means for supplying a variable reference admittance to said bridge circuit means further comprises:
switched capacitor means; and
means responsive to said calibration enabling signals supplied by said calibrator for controlling said switched capacitor means.

81. The system of claim 80 wherein said switched capacitor means further comprises:
a number of individual capacitors each connected in series with a switch.

82. The system of claim 80 wherein said means for controlling said switched capacitor means further comprises:
means for stepping through a sequence of combinations of said capacitors by closing corresponding ones of said switches.

83. The system of claim 82 wherein said sequence comprises a range from a minimum to a maximum admittance value in response to said calibration enabling signals.

84. The system of claim 79 wherein said calibrator may be operated in differing modes and wherein:
the rate of supply of said calibration enabling signals to said transmitter is varied according to the mode of operation.

85. The system of claim 84 wherein said calibrator further comprises:
means for monitoring the signals transmitted by said transmitter on said communication channel, and wherein said differing modes of operation of said calibrator include:
a calibration mode, in which the calibrator is operated to transmit calibration enabling signals so as to cause the switched capacitor means to vary the reference admittance supplied to the bridge circuit means at a first rate, until the means for transmitting an output signal indicating that the varied reference admittance bears a predetermined relationship to the admittance sensed by said probe transmits said output signal, and in which the calibrator is operated thereafter to transmit calibration enabling signals so as to cause the switched capacitor means to vary the reference admittance supplied to the bridge circuit means at a second rate to provide preload to the system.

86. The system of claim 84 wherein said differing modes of operation of said calibrator further include:
a recalibration mode, in which said calibrator transmits calibration enabling signals in order to cause said switched capacitor means to vary the reference admittance from its minimum admittance value to a predetermined preload setpoint value at a fixed rate.

87. The system of claim 84, wherein said differing modes of operation of said calibrator further include:
a check mode in which the calibrator transmits calibration enabling signals in order to cause the switched capacitor means to iteratively vary the reference admittance supplied to said bridge circuit means through its entire range of admittance values.

88. The system of claim 87 wherein:
said calibrator is adapted to display the point in said sequence of combinations of capacitors reached by the switched capacitor means after said iteration through its entire range of admittance values.

89. The system of claim 88 wherein:
said means responsive to said bridge circuit transmits a bistable ouptut signal over said communication channel in response to the comparison of the reference admittance to the admittance sensed by the probe, and said calibrator further comprises:
means for monitoring said output signal and for distinguishing between high-to-low and low-to-high transitions of said bistable output signal in order to display the point reached by the switched capacitor means in the sequence of combinations of capacitors after said iteration.

90. A remotely calibratable instrument system comprising:
    a calibrator including means for transmitting calibration enabling signals;
    a probe; and
    a transmitter, said calibrator and said transmitter being connected by a communication channel, said probe being connected to said transmitter, said calibrator being remote from said transmitter and supplying said calibration enabling signals to said transmitter over said communication channel, said transmitter comprising:
    means responsive to said calibration enabling signals for varying a reference signal through a range of variation in response to receipt of said calibration enabling signals;
    means for comparing said reference signal to an input signal received from said probe; and
    means responsive to said comparison for transmitting a variable output signal over the communication channel, said calibrator further comprising:
    means for detecting a variation in said output signal;
    means for display; and
    means responsive to said detecting means for controlling said means for display wherein said calibrator is operable in a check mode in which said calibrator transmits calibration enabling signals so as to cause said transmitter to vary the reference signal in a predetermined manner such that said means for controlling causes said display to provide an indication of the position of said varied reference signal in said range.

91. The system of claim 90 wherein said transmitter iteratively varies the reference signal upon receipt of calibration enabling signals from said calibrator.

92. The system of claim 91 wherein said reference signal is iteratively varied through its entire range, extending from a starting value to a maximum value, from said maximum value to a minimum value and thence to its initial value, in response to said calibration enabling signals.

93. The system of claim 92 wherein said means for display provides an operator-readable indication of the relative position of the varied reference signal in its range after iteration through said entire range.

94. The system of claim 93 wherein said means for controlling said means for display comprises:
    means for detecting the point in said range of variation of said reference signal at which said reference signal goes from its maximum value to its minimum value.

95. The system of claim 94 wherein said output signal transmitted by said transmitter is a bistable output signal and wherein said calibrator comprises:
    means for detecting changes in state of said bistable output signal.

96. The system of claim 95 wherein said bistable output signal is a current signal, and wherein said calibrator comprises:
    means for differentiating between high-to-low current transitions and low-to-high current transitions on said communication channel.

97. The system of claim 90 wherein said means for supplying a variable reference signal comprises:
    switched capacitor means; and
    means responsive to said calibration enabling signals supplied by said calibrator for controlling said switched capacitor means.

98. The system of claim 97 wherein said switched capacitor means comprises:
    a number of individual capacitors each connected in series with a switch.

99. The system of claim 98 wherein said means for controlling said switched capacitor means comprises:
    means for stepping through a sequence of combinations of said capacitors by closing corresponding ones of said switches.

* * * * *